Patented Oct. 13, 1925.

1,556,759

UNITED STATES PATENT OFFICE.

JAMES J. CONNELLY, OF CHICAGO, ILLINOIS.

CONCRETE PRODUCT AND PROCESS OF MANUFACTURING THE SAME.

No Drawing.   Application filed September 5, 1923.   Serial No. 661,107.

*To all whom it may concern:*

Be it known that I, JAMES J. CONNELLY, a citizen of the United States, residing at Chicago, in the county of Cook and State of Illinois, have invented certain new and useful Improvements in Concrete Products and Processes of Manufacturing the Same, of which the following is a specification.

This invention relates to a process of manufacturing products from concrete, as well as the products manufactured from said process, such as flower pots and pottery ware or products which are employed wherever hard wearing permanently colored concrete articles are desired, but it is to be understood that a process, in accordance with this invention, can be employed in connection with the manufacture of any class of products for which the process is found applicable, and the invention has for its object to provide, in a manner as hereinafter set forth, a process for producing a permanently colored concrete product of any desired color or shape, as well as a concrete product which will be light in weight, strong, durable and not easily chipped, as well as a concrete product which can be used wherever a hard wearing permanently colored concrete article is desired.

In manufacturing a concrete product in accordance with the process of this invention, there is employed the usual lime or magnesia cements to which is added a color-absorbing medium which also acts to reduce the brittleness to a minimum in the ultimate product, and there is further added a second color-absorbing medium which also acts as a means to increase the strength and durability of the ultimate product.

The color-absorbing medium which also acts to reduce brittleness to a minimum of the ultimate product, is prepared from wood and paper reduced to a semi-pulpy mixture which is then dried and ground into a fine dust and with this dust is mixed a suitable mineral color or colors, after which the dust is thoroughly dried.

The color-absorbing medium which further acts to give strength and durability to the ultimate product, is prepared from a tenacious substance, such as clay and colored throughout to correspond in color to the color of the dust which is formed from the semi-pulpy mixture. The clay is then formed into slabs, then hardened by fire, or in any suitable manner, and the colored slabs are then crushed into fine particles.

The colored fine dust and the colored fine particles of clay, as well as the usual lime or magnesia cements, are mixed together with water in proportion to give the desired strength and durability to the product. As the water is added, the excess coloring matter in the dried colored dust, formed from the semi-pulpy mixture of wood and paper, permeates the cement and any other aggregates which may be added to the mixture, such as river sand and silicas, which together with the colored fine particles of clay give the desired color throughout to the mass.

The mass is then placed in molds and subjected to pressure to give it the desired density and shape.

The ingredients composing the semi-pulpy mixtures from a soft clinging cement or binder thereby reducing the brittleness of the finished product and which tends to prevent chipping or breaking off of the same.

The method of manufacturing products from concrete, as referred to, will provide for the forming of permanently colored concrete products of any desired shape, color or shade, depending upon the color which has been mixed with the fine dust and which corresponds to the color mixed with the clay, and as before stated, a permanently colored concrete product is not only derived from the process, but also a product which can be used wherever a hard wearing permanently colored concrete article can be used.

What I claim is—

1. As a new article of manufacture a homogeneous product colored throughout and consisting of a dried, pulverized and colored vegetable fibrous body formed from a semi-pulpy mixture of wood and paper with the addition of a mineral color, a colored, hardened and finely crushed tenacious body formed from a mass of clay colored to correspond to the color of the fibrous body and subsequently hardened and crushed, and a cementitious substance.

2. The process of manufacturing a homogeneous concrete product colored throughout, consisting in forming a semi-pulpy mixture of wood and paper, then successively grinding, drying, coloring and drying the same to provide a colored powdered, dried body, then correspondingly coloring a body of clay and subsequently hardening and crushing said colored clay body into fine particles and then mixing said bodies with a body of cementitious material combined with the addition of water in a proportion to provide a homogeneous mixture colored throughout and of a consistency to be molded.

In testimony whereof, I affix my signature hereto.

JAMES J. CONNELLY.